United States Patent
Saito et al.

(10) Patent No.: US 12,181,398 B2
(45) Date of Patent: Dec. 31, 2024

(54) PARTICLE MEASURING DEVICE AND PARTICLE MEASURING METHOD

(71) Applicant: RION CO., LTD., Kokubunji (JP)

(72) Inventors: Mitsuaki Saito, Kokubunji (JP); Reiko Sugahara, Kokubunji (JP); Yuka Yoshikawa, Kokubunji (JP)

(73) Assignee: RION CO., LTD., Tokyo (JP)

(*) Notice: Subject to any disclaimer, the term of this patent is extended or adjusted under 35 U.S.C. 154(b) by 215 days.

(21) Appl. No.: 17/558,289

(22) Filed: Dec. 21, 2021

(65) Prior Publication Data
US 2022/0205892 A1    Jun. 30, 2022

(30) Foreign Application Priority Data
Dec. 24, 2020   (JP) ................... 2020-215214

(51) Int. Cl.
*G01N 15/0205*    (2024.01)
*G01N 15/10*    (2024.01)
*G01N 15/14*    (2024.01)

(52) U.S. Cl.
CPC .  *G01N 15/0205* (2013.01); *G01N 2015/1024* (2024.01); *G01N 2015/1486* (2013.01)

(58) Field of Classification Search
CPC ....... G01N 15/0205; G01N 2015/1062; G01N 2015/1486
See application file for complete search history.

(56) References Cited

U.S. PATENT DOCUMENTS 5,411,682 A * 5/1995 Nagashima ........ G01N 21/8851
264/36.15
5,530,551 A * 6/1996 Cantrall ............... G01B 11/105
356/394

(Continued)

FOREIGN PATENT DOCUMENTS

| JP | 4960772 B2 | 6/2012 | |
| JP | 6531499 B2 | 6/2019 | |
| WO | WO-2005024715 A1 * | 3/2005 | ......... G01N 15/0211 |

OTHER PUBLICATIONS

J. J. Collins et al., "Stochastic resonance without tuning", Nature vol. 376, p. 236-238, Jul. 20, 1995.

*Primary Examiner* — Edmond C Lau
*Assistant Examiner* — Jarreas C Underwood
(74) *Attorney, Agent, or Firm* — PROCOPIO, CORY, HARGREAVES & SAVITCH LLP

(57) ABSTRACT

A particle measuring device includes: a detection unit that detects scattered light generated due to interaction between a particle contained in a liquid sample and light incident thereon, and converts the detected scattered light into a signal; an addition unit that performs a predetermined number of parallel processing on the signal to add the predetermined number of uncorrelated noises thereto and outputs the resulting signals; a binarization unit that binarizes the resulting signals using a binarization threshold set in accordance with the liquid sample, and outputs the binarized signals; a calculation unit that calculates and outputs a value based on the binarized signals; a filter unit that passes a predetermined frequency component of the output of the calculation unit; and a determination unit that determines that the particle is present when an output of the filter unit exceeds a predetermined particle threshold.

7 Claims, 8 Drawing Sheets

(56) References Cited

U.S. PATENT DOCUMENTS

| | | | |
|---|---|---|---|
| 6,781,688 B2 * | 8/2004 | Kren | G01N 21/9501 356/394 |
| 2004/0011974 A1 * | 1/2004 | Matsuda | G01N 21/53 250/574 |
| 2006/0020452 A1 * | 1/2006 | Nakatani | B60Q 9/00 704/226 |
| 2008/0246963 A1 * | 10/2008 | Nakajima | G01N 15/0205 356/336 |
| 2011/0269175 A1 * | 11/2011 | Durack | G01N 15/1404 435/29 |
| 2016/0356896 A1 * | 12/2016 | Masunaga | G01T 1/17 |
| 2018/0096218 A1 * | 4/2018 | Tanaka | G06T 5/70 |

\* cited by examiner

[COMPARATIVE EXAMPLE]

PARTICLE MEASURING DEVICE AND PARTICLE MEASURING METHOD

CROSS-REFERENCE TO RELATED APPLICATIONS

This application is based on and claims priority under 35 USC 119 from Japanese Patent Application No. 2020-215214 filed on Dec. 24, 2020, the contents of which are incorporated herein by reference.

TECHNICAL FIELD

The present invention relates to a device and a method for measuring a particle present in a liquid sample. In particular, it relates to a device and a method using a stochastic resonance phenomenon for detection of a fine particle.

BACKGROUND ART

Stochastic resonance is a phenomenon in which noise is added to a signal so as to boost the signal and improve response under a certain probability. The stochastic resonance is a suitable method for detecting a weak signal under the effect of noise. For example, there has been known a method for performing parallel processing where noises uncorrelated with one another are added to an input signal including the weak signal respectively (e.g. see non-PTL 1). In orthodox signal processing using this method, signals obtained by such k parallel processing where noises are added to the input signal respectively are binarized using a fixed binarization threshold, as shown in FIG. 9.

In addition, in a particle detection field, there has been known a signal processing method for improving detection accuracy (a signal-to-noise ratio) of a fine particle contained in air by use of stochastic resonance (e.g. see PTL 1). In the signal processing, the signal-to-noise ratio is optimized by use of an electric signal in which a noise signal is added to a simulation signal (a weak signal whose pulse number and pulse waveform are known).

CITATION LIST

Patent Literature

PTL 1: Japan Patent No. 6531499

Non-Patent Literature

Non-PTL 1: J. J. Collins et al, "Stochastic resonance without tuning", Nature Vol. 376, p. 236-238, Jul. 20, 1995

In a field of measuring particles in a liquid, products whose minimum measurable particle sizes are set at 30 nm have been already known. For example, as semiconductor process size are further miniaturized, measurement of particles each with a particle size of less than 30 nm is required. However, update of the minimum measurable particle size is reaching its limit in the existing measuring method. In addition, a problem peculiar to the fact that the measurement sample is a liquid must be taken into consideration in studying a new method.

That is, in measuring the particles in the liquid, scattered light of the sample itself to be measured is a noise source. This scattered light is however much larger than scattered light of air. Moreover, intensity of the scattered light depends on the sample and also changes according to a measurement environment such as temperature. Therefore, even if the particles in the liquid are measured by use of the stochastic resonance, it is still difficult to accurately measure the particles by application of only the aforementioned orthodox signal processing using the fixed binarization threshold. In order to ensure the accuracy satisfactorily, it is necessary to adjust the binarization threshold to cope with the change in amplitude of the noise of the sample caused by factors such as a refractive index and isothermal compressibility of the sample.

Specifically, when the binarization threshold is fixed, it is necessary to set the binarization threshold to a value larger than maximum noise that can be anticipated so that misdetection due to the noise caused by the scattered light of the sample can be eliminated under any circumstances. In addition, when the scattered light of the sample is small, the binarization threshold also needs to be set to be small in order to detect a weak particle signal. When the binarization threshold is manually adjusted according to each sample to be measured, it takes time and effort, and the adjustment may be unsettled.

On the other hand, according to the background art in the aforementioned particle detection field, it is considered that the effect of noise in a circuit system can be reduced, but it is difficult to reduce the effect of the noise caused by the scattered light generated from the sample. In addition, in the background art, adjustment must be made based on the known information about the pulse before the measurement. Therefore, it requires time and effort for preparation.

Furthermore, in order to use stochastic resonance, uncorrelated noises must be prepared. In the signal processing using the stochastic resonance, it has been known that detection accuracy of the weak signal increases as the parallel number k is larger. For this reason, k sets of uncorrelated noises are required. How to prepare these noises also becomes an issue because resources available in the measuring device are limited.

SUMMARY

Therefore, an object of the present invention is to provide a technique that increases counting efficiency while reducing a measurable particle size of a particle.

In order to solve the foregoing problem, the present invention provides the following liquid-borne particle measuring device, the following liquid-borne particle measuring method, and the following signal processing program. Incidentally, the following expressions in parentheses are only exemplary, and the present invention is not limited thereto.

That is, in the liquid-borne particle measuring device, the liquid-borne particle measuring method, and the signal processing program according to the present invention, a predetermined number of parallel processing are performed on a signal with a magnitude corresponding to intensity of scattered light generated due to interaction between a particle contained in a liquid sample and light incident on the liquid sample so that the predetermined number of uncorrelated noises are added to the signal in the parallel processing respectively, and resulting signals after the addition are outputted. Then, the resulting signals are binarized using a binarization threshold set in accordance with the liquid sample, and the binarized signals are outputted. A value based on the binarized signals is calculated and outputted. Of the output calculated thus, a predetermined frequency component is allowed to pass through. When the output passing through thus exceeds a predetermined particle threshold, it is determined that a particle is present.

According to this aspect, a level of a signal derived from background light included in the scattered light signal is lowered. On the other hand, the signal derived from the particle can be made to stand out relatively clearly so that even a weak signal derived from a fine particle can be reliably detected. In addition, according to this aspect, binarization is performed using the binarization threshold set according to the liquid sample. Accordingly, the particle can be detected more accurately than when a fixed binarization threshold is used.

Preferably, in the aforementioned liquid-borne particle measuring device, the aforementioned liquid-borne particle measuring method, and the aforementioned signal processing program, the binarization threshold is calculated based on a characteristic amount of the liquid sample, and binarization is performed using the calculated binarization threshold. More preferably, the binarization threshold is calculated based on an RMS value or a DC value of the scattered light component of the liquid sample. The RMS value or the DC value will be described later.

According to this aspect, the binarization threshold is automatically calculated and set based on the characteristic amount of the liquid sample, such as the RMS value or the DC value of the scattered light component of the liquid sample. Accordingly, the time and effort required for preparing the measurement can be reduced compared with a case where the binarization threshold is set manually. Consequently, it is possible to detect a lower-level signal derived from the particle while reducing misdetection.

More preferably, in the aforementioned liquid-borne particle measuring device, the aforementioned liquid-borne particle measuring method, and the aforementioned signal processing program, starting points of noise data with a predetermined data length prepared in advance are made different from one another to generate a plurality of uncorrelated noises. In this mode, the predetermined number of the noises are generated, and the noises are added respectively in the predetermined number of the parallel processing.

According to this aspect, a method for generating a number of uncorrelated noises corresponding to a number of parallel processing by use of certain (one or predetermined-length) noise data is used. The method for generating the correlated noises is a mode (method) in which the start points of the noise data are made different from one another so as to generate the uncorrelated noises. Therefore, types or a volume of the noise data required for generating the noises can be suppressed and the noises required for measurement can be generated efficiently.

According to the present invention, as described above, it is possible to increase the counting efficiency while reducing the measurable particle size of the particle.

DESCRIPTION OF EMBODIMENTS

An embodiment of the present invention will be described below with reference to the drawings. Incidentally, the following embodiment is a preferred example, and the present invention is however not limited to this example.

[Particle Measuring Device]

Figure 1:
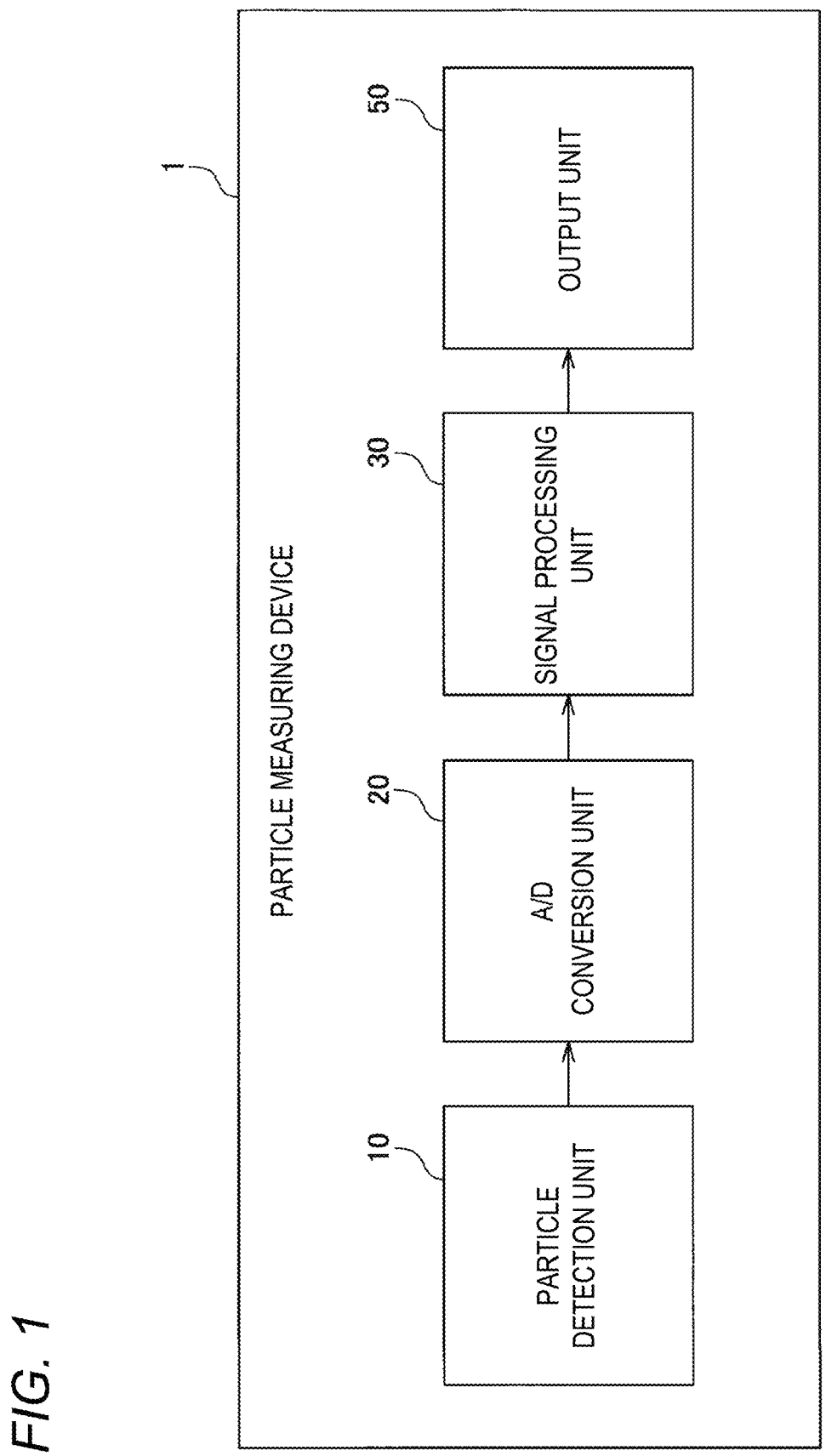
FIG. 1 A block diagram showing a configuration of a particle measuring device.

FIG. 1 is a block diagram showing a configuration of a particle measuring device 1.

The particle measuring device 1 includes, for example, a particle detection unit 10, an A/D conversion unit 20, a signal processing unit 30, and an output unit 50. The particle detection unit 10 irradiates a liquid sample with light, detects scattered light generated due to interaction between a particle floating in the sample and the irradiated light, and outputs an electrical signal corresponding to intensity of the detected scattered light. The A/D conversion unit 20 converts the electrical signal outputted from the particle detection unit 10 into a digital signal. The signal processing unit 30 applies various signal processing to the digital signal outputted from the A/D conversion unit 20, detects the particle (determines presence of the particle), and counts the particle in accordance with each particle size range. The output unit 50 outputs a result of the counting performed by the signal processing unit 30.

In the present embodiment, signal processing using stochastic resonance is performed in the signal processing unit 30 in order to accurately detect a particle with a particle size of less than 30 nm. Incidentally, capability about accuracy of an optical system used in the present embodiment is assumed to be capable of measuring a particle with a particle size of about 20 nm. Further, it can be also expected that a particle with a particle size of 10 nm or less can be accurately detected if the accuracy of the optical system is improved. Incidentally, configurations of the particle detection unit 10 and the signal processing unit 30 will be further described below using different drawings.

[Particle Detection Unit]

Figure 2A:
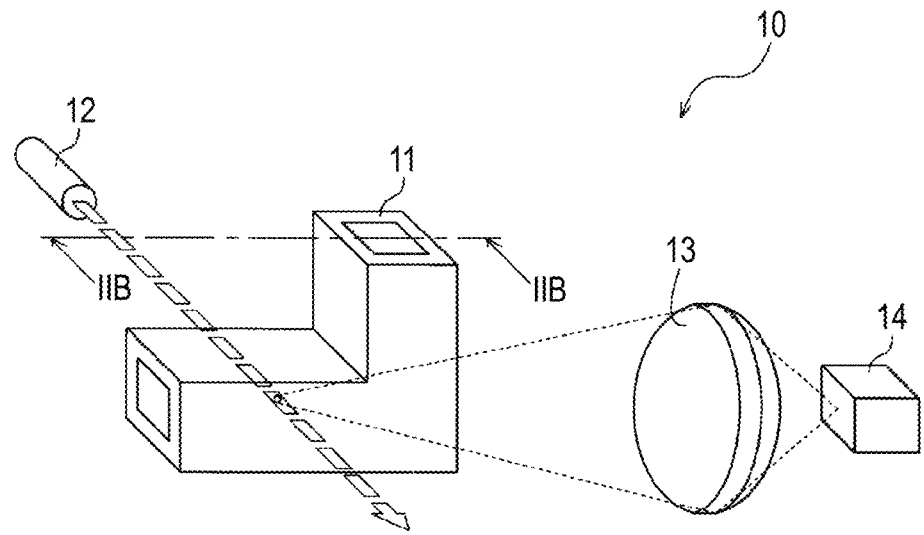
FIG. 2A A perspective view showing a configuration of a particle detection unit.
Figure 2B:
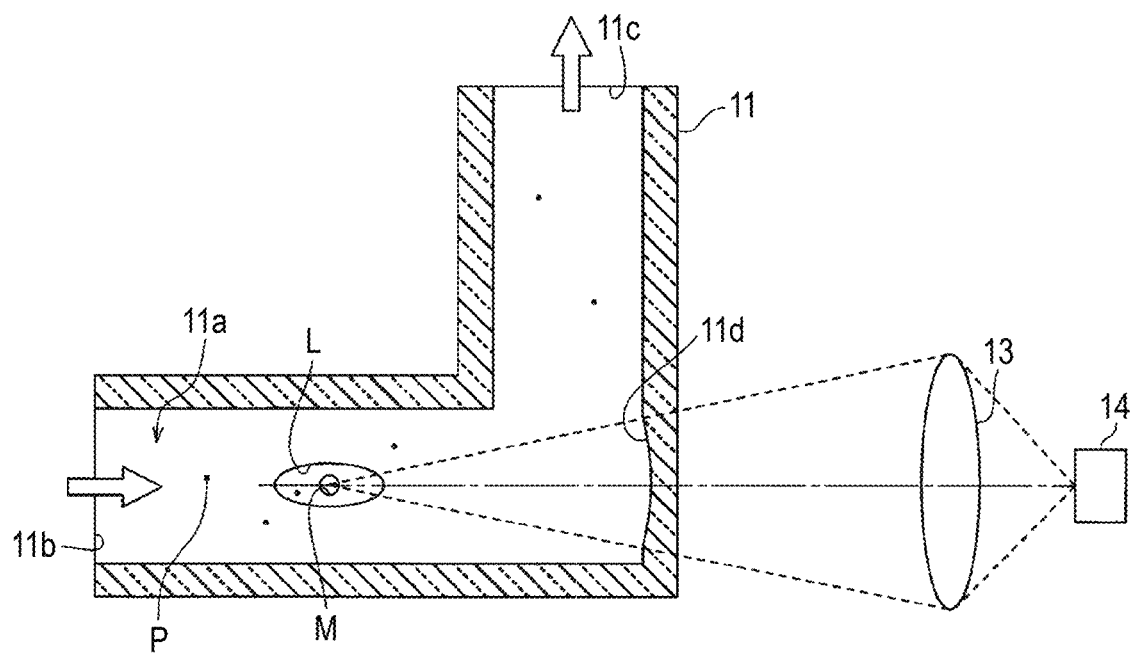
FIG. 2B A vertical sectional view showing the configuration of the particle detection unit.

FIGS. 2A and 2B are a perspective view and a sectional view briefly showing the configuration of the particle detection unit 10. The sectional view of FIG. 2B is a vertical sectional view taken along a cutting line IIB-IIB shown in the perspective view of FIG. 2A.

The particle detection unit 10 is, for example, constituted by a flow cell 11, a light source 12, a condensing lens 13, a photoelectric converter 14, and the like. The flow cell 11 has an L-shape, and a flow channel 11a is formed so as to penetrate the inside of the flow cell 11. A sample is introduced into the flow channel 11a through a first opening 11b and discharged to the outside through a second opening 11c. Moreover, the light source 12 irradiates laser light from a direction perpendicular to a flow of the sample. In the present embodiment, a 532 nm green laser is used as irradiated light in consideration of detection of a particle with a particle size of less than 30 nm. When the laser light is irradiated, an irradiation area L and a detection area M are formed at predetermined positions in the flow channel 11a, and scattered light is generated from a particle P which has passed through the detection area M. The condensing lens 13 condenses the scattered light generated from the particle P. The photoelectric converter 14 detects the condensed scattered light, converts the scattered light into a voltage corresponding to intensity of the scattered light, and outputs an electric signal. Incidentally, the photoelectrical converter 14 is a part of a detection unit in the embodiment of the present invention.

The condensing lens 13 and the photoelectric converter 14 are disposed at positions facing the flow of the sample. As a result, the scattered light generated from the particle P can be accurately detected. In addition, with a concave portion 11d that is formed in an inner wall of the flow cell 11 positioned between the detection area M and the condensing lens 13, it is possible to suppress refraction that may occur when the scattered light generated from the particle P that has passed through the detection area M is incident on the inner wall of the flow cell 11. Incidentally, arrangement of the respective devices in the particle detection unit 10 is determined with reference to a condensing axis, and an incident position of the irradiated light is designed so as to make the center of the detection area M positioned on the condensing axis.

[A/D Conversion Unit]

The electrical signal ("detection signal") outputted from the photoelectric converter 14 includes not only a signal ("target signal") that is detected when the particle P has passed through the detection area M, but also such as noise ("scattered noise") that is caused by the scattered light of the sample. In addition, it is assumed that the target signal is a signal having a Gaussian distribution in a frequency band up to about 15 kHz.

The detection signal is sampled, quantized and converted into a digital signal by the A/D conversion unit 20. In the present embodiment, for the purpose of anti-aliasing, a second-order low-pass filter using 60 kHz as a cutoff frequency to provide a sufficient margin to the frequency band of the target signal is applied to the detection signal. In addition, in order to keep quantization noise as low as possible, it is desirable to be oversampled at a rate about 20 times of the maximum frequency of the detection signal, and further the number of quantization bits is set at 16 bits. That is, the detection signal is sampled at a rate of 5 Msps. Incidentally, the A/D conversion unit 20 is a part of the detection unit in the embodiment of the present invention. Incidentally, a part of a detection step in the embodiment of the present invention is performed by the photoelectric converter 14, and another part of the detection step is performed by the A/D conversion unit.

[Signal Processing Unit]

Figure 3:
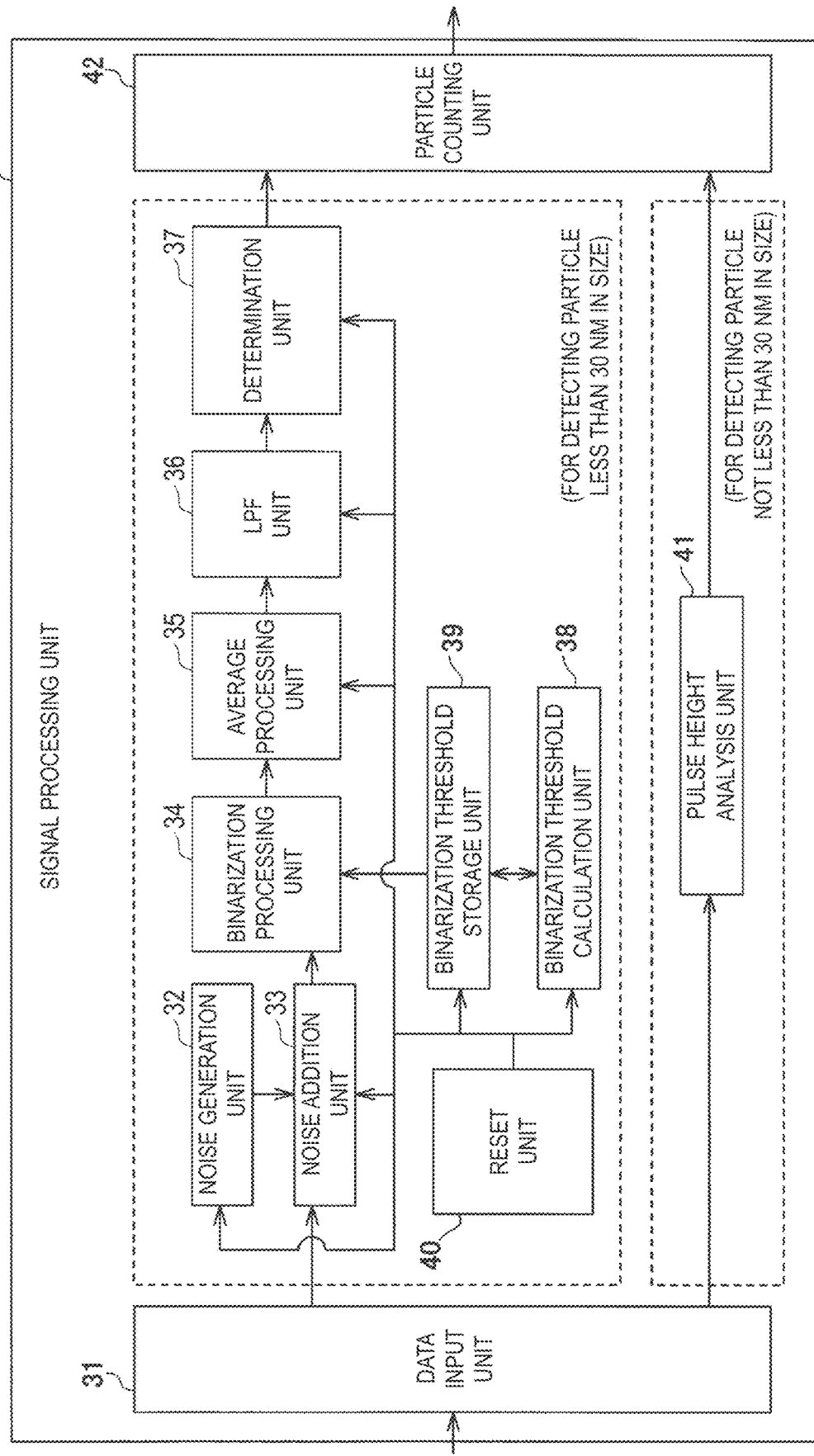
FIG. 3 A block diagram showing a configuration of a signal processing unit.

FIG. 3 is a block diagram showing the configuration of the signal processing unit 30.

The signal processing unit 30 is, for example, constituted by a data input unit 31, a noise generation unit 32, a noise addition unit 33, a binarization processing unit 34, an average processing unit 35, an LPF unit 36, a determination unit 37, a binarization threshold calculation unit 38, a binarization threshold storage unit 39, a reset unit 40, a pulse height analysis unit 41, a particle counting unit 42, and the like. Of these, the respective functional units from the noise generation unit 32 to the reset unit 40 contribute to detection and counting of a particle with a particle size of less than 30 nm, and the pulse height analysis unit 41 contributes to detection and counting of a particle with a particle size of not less than 30 nm. Functions of the respective functional units constituting the signal processing unit 30 will be described below along a flow of a signal.

[Data Input Unit]

The digital signal (signal data) outputted from the A/D conversion unit 20 is inputted to the data input unit 31. The data input unit 31 outputs the input signal in its original state. Incidentally, in the present embodiment, the signal data are sequentially inputted in real time. However, the signal data stored in a storage area (not shown) such as an internal memory may be alternatively read and inputted.

By the way, the input signal includes not only the target signal but also the noise generated in the process of measurement. In the present embodiment, in order to also detect a particle with a particle size of less than 30 nm as a detection subject, noise due to the measurement needs to be suppressed as low as possible.

Typical noises included in the input signal include not only the aforementioned scattered noise but also the quantization noise during the A/D conversion and thermal noise derived from an electric circuit. Of these noises, measures for the quantization noise during the A/D conversion are taken during the processing in the A/D conversion unit 20 as described above. Moreover, the thermal noise of the electric circuit, which is noise in the order of 1 mV, may be considered to be sufficiently small in comparison with the scattered noise which is noise in the order of 100 mV. The scattered noise is dealt with in subsequent signal processing.

[Noise Generation Unit]

The noise generation unit 32 generates and outputs a number of noises that are uncorrelated with one another and that correspond to a parallel number in processing in the noise addition unit 33 which will be described below. In the present embodiment, a connected data is obtained as one noise data with a certain data length stored in a (not-shown) storage area (storage unit) is repeatedly connected. With using positions, as start points, shifted by every predetermined data length from the head of the connected data, a plurality of noises is generated from the one noise data. Incidentally, it is desirable that the noise data used for generation is white Gaussian noise.

[Noise Generation Mode]

Figure 4:
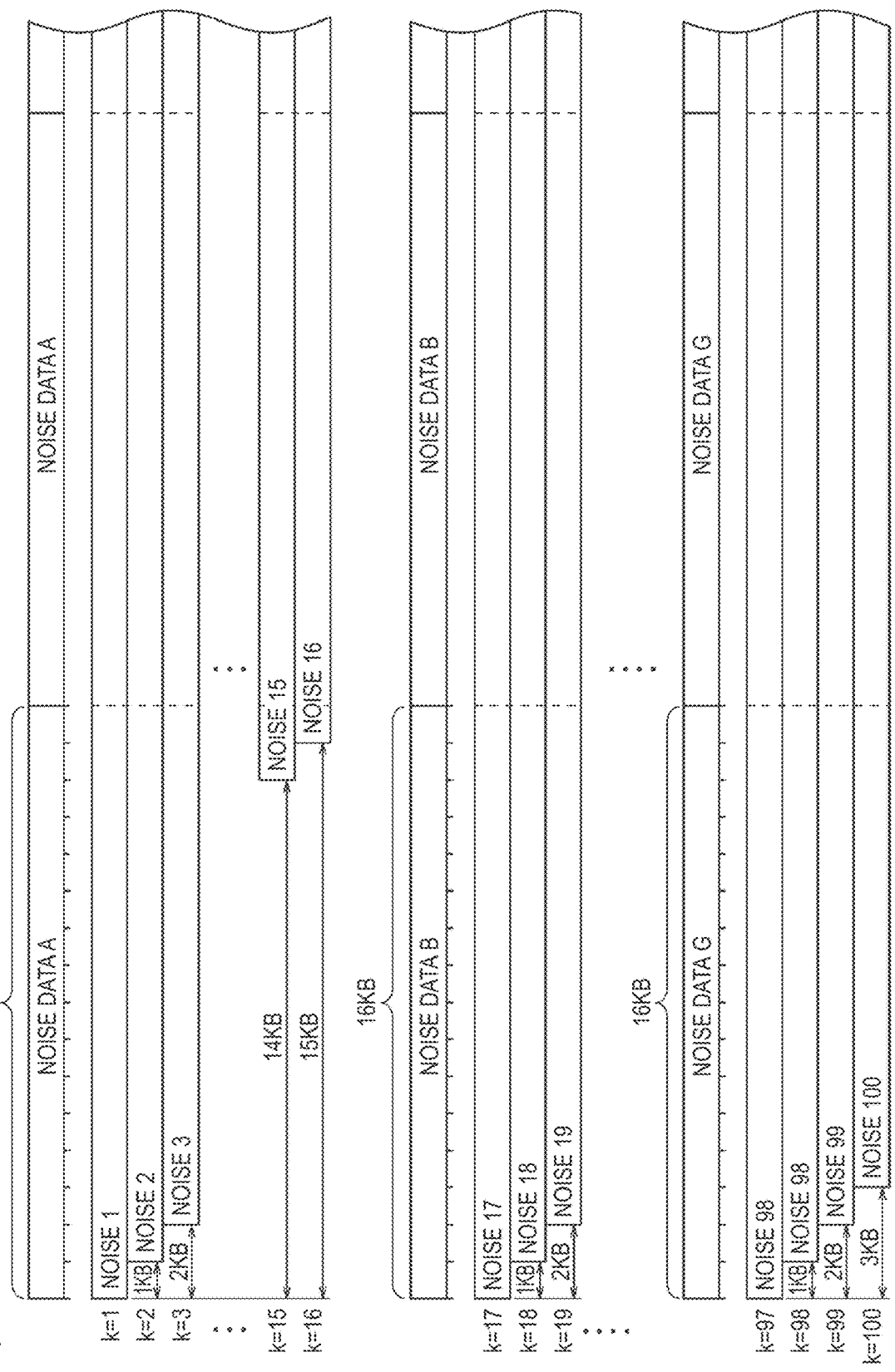
FIG. 4 A view illustrating a noise generation mode.

FIG. 4 is a view illustrating a noise generation mode.

For example, in a case where a parallel number k=100, the noise generation unit 32 prepares seven types of uncorrelated noise data A to G each having a data length of 16 kB. For each type of uncorrelated noise data, the noise generation unit 32 repeatedly connects the uncorrelated noise data to obtain connected data, and generates 100 noises with using positions, as start points, shifted by every 1 kB from the head of the connected data.

Specifically, from the connected data based on the noise data A, the following noises are generated: noise 1 using the head of the connected data as the starting point, noise 2 using the position shifted by 1 kB from the head as the starting point, noise 3 using the position shifted by 2 kB from the head as the starting point, . . . , noise 15 using the position shifted by 14k B from the head as the starting point, and noise 16 using the position shifted by 15 kB from the head as the starting point. The noise data B and the following noise data are processed in a similar manner or the same manner so that sixteen noises can be generated for each noise data.

Since the noise data A to G are uncorrelated, the noises generated based on the noise data A to G using different starting points respectively are also uncorrelated. By generating the noises in such a mode, it is possible to generate the plurality of uncorrelated noises while suppressing the number or volume of the noise data required for the generation.

Incidentally, the data length of the noise data and the predetermined length by which the starting points are shifted from one another can be changed suitably according to the situation. In any case, the number of noises that can be generated for each noise data is naturally determined according to the values of the data length and the predetermined length. Therefore, the number of noise data to be prepared in advance is a number obtained by adding one to the quotient obtained by dividing the parallel number k by the number of the noises that can be generated for each noise data.

Moreover, in the present embodiment, the noises are generated using the noise data stored in the storage area. However, the noises may be alternatively generated by an arithmetic operation. For example, a pseudo-random number generation method using an M-sequence may be used to generate the noises.

[Noise Addition Unit]

The noise addition unit 33 performs parallel processing on the input signal (output signal from the data input unit 31) as the number of the parallel processing is k. In the parallel processing, k sets of uncorrelated noises generated by the noise generation unit 32 are added to the input signal with one and the same intensity (noise addition amount β) respectively, and the addition results are outputted. In the present embodiment, the parallel number k=100. In addition, the noise addition amount β depends on intensity of the target signal or scattered noise derived from background light, a medium to be measured, and temperature, concentration etc. of the medium. In the present embodiment, a value determined based on experiments that have been conducted in advance is applied as the noise addition amount β. Incidentally, the noise addition amount 13 may be taken into consideration when the noises are generated in the noise generation unit 32. In that case, each of the noises is directly added to the input signal in the noise addition unit 33. Incidentally, the noise addition unit 33 is a part of an addition unit in the embodiment of the present invention. Incidentally, a part of an addition step in the embodiment of the present invention is performed by the noise addition unit 33.

Due to an increase in the parallel number, an amount of the arithmetic operation increases but the target signal can be made to stand out more clearly against the noise signal in processing which will be described later, so that detection accuracy can be improved. However, when the parallel number exceeds a certain number, the improvement in the detection accuracy becomes asymptotic. Accordingly, it is desirable to select an appropriate value for the parallel number in consideration of the situation of the target signal or the noises in the measurement, the arithmetic processing capability of the signal processing unit 30, and the like.

[Binarization Processing Unit]

The binarization processing unit 34 compares each of the k sets of outputs from the noise addition unit 33 with a binarization threshold m of stochastic resonance, and outputs "1" when the output is not less than m, or outputs "0" when the output is less than m. The binarization threshold m of the stochastic resonance is calculated by the binarization threshold calculation unit 38 which will be described later, and stored in the binarization threshold storage unit 39 which will be described later. Incidentally, the binarization processing unit 34 is a part of a binarization unit in the embodiment of the present invention. Incidentally, a part of a binarization step in the embodiment of the present invention is performed by the binarization processing unit 34.

[Average Processing Unit]

The average processing unit 35 is an example of a calculation unit according to the present invention. The average processing unit 35 adds up the k sets of outputs from the binarization processing unit 34 and then divides the addition result by k to thereby calculate a simple average. The average processing unit 35 converts the calculated simple average into a value from 1 to 1024 ($=2^{10}$) with a resolution of 10 bits, and outputs the converted value. Incidentally, in consideration of convenience etc. in the latter half of the processing step, the average processing unit 35 may be set not to perform the division by k. In that case, calculation based on the fact that the parallel number is k is carried out in processing steps before and after the processing step in the average processing unit 35. In addition, an average (weighted average) in which some weighting is applied to each of the k sets of outputs, etc. may be calculated in place of the simple average. Incidentally, the average processing unit 35 is a part of a calculation unit in the embodiment of the present invention. Incidentally, a part of a calculation step in the embodiment of the present invention is performed by the average processing unit 35.

[LPF Unit]

The LPF unit 36 applies a low-pass filter to the output signal from the average processing unit 35. In the present embodiment, the LPF unit 36 uses a third-order low-pass filter with its cutoff frequency set at 15 kHz so as to pass a component of the output signal corresponding to a range of from approximately 100 Hz to 15 kHz, which is a frequency band of the target signal. Thus, any signal with short duration is cut so that it is possible to eliminate misdetection of a particle. Incidentally, since an inclination of the filter here does not need to be very steep, a second-order filter may be used in place of the third-order filter. In addition, any filter may be used as the LPF unit 36 as long as the filter can pass the frequency component of approximately 100 Hz or higher which is the frequency band of the target signal. The LPF unit 36 is not limited to the low-pass filter but may be realized by a bandpass filter passing the frequency band of the target signal, or any combination such as a combination of a high-pass filter and a band-stop filter aiming at restricting a frequency band other than the frequency band of the target signal. Incidentally, the LPF unit 36 is a part of a filter unit in the embodiment of the present invention. Incidentally, a part of a filter step in the embodiment of the present invention is performed by the LPF unit 36.

[Determination Unit]

The determination unit 37 checks whether or not the output signal from the LPF unit 36 exceeds a predetermined threshold ("particle threshold") that has been determined in advance according to a minimum measurable particle size of the particle measuring device 1. When the output signal exceeds the particle threshold, the determination unit 37 determines presence of the particle, i.e. the signal derived from the particle, so as to output a pulse indicating the determination. On the other hand, when the output signal does not exceed the particle threshold, the determination unit 37 determines absence of the particle, i.e. not the signal derived from the particle, so as not to output a pulse. In the present embodiment, for example, the minimum measurable particle size is set at "20 nm", "850" that has been determined in advance correspondingly to "20 nm" is set as the particle threshold, and the determination unit 37 makes the aforementioned determination as to the output taking the value from 1 to 1024. The detection threshold that is a threshold for detecting a particle having the minimum measurable particle size or more without causing any misdetection is derived based on experiments that have been conducted in advance. Incidentally, a part of the determination step in the embodiment of the present invention is performed by the determination unit 37.

[Binarization Threshold Calculation Unit]

Upon reception of a reset signal from the reset unit 40 which will be described later, the binarization threshold calculation unit 38 calculates a binarization threshold of the stochastic resonance in accordance with the measurement sample at that point of time. The binarization threshold is calculated by the following calculation expression. Incidentally, a part of a binarization threshold calculation step in the embodiment of the present invention is performed by the binarization threshold calculation unit 38.

Binarization Threshold=(Binarization Coefficient)×(Noise-Based Setting Value)   <Mathematical 1>

Of the aforementioned calculation expression, the binarization coefficient is a value determined in advance based on a design value of an optical device. Moreover, the noise-based setting value is a value set in accordance with a characteristic amount of a scattered light component of the measurement sample during measurement. Specifically, an RMS value or a DC value of the scattered light component of the measurement sample, or a value based on the RMS value and the DC value and the like, corresponds to the noise-based setting value. The RMS value is an effective value of an alternating-current component in a measurement signal, and is calculated by a square root of a mean square of the signal. The DC value is a direct-current component value in the measurement signal. That is, the RMS value or the DC value is used as the characteristic amount of the measurement sample in the present embodiment.

Incidentally, the characteristic amount of the scattered light component taken into consideration in setting the noise-based setting value is not limited to the RMS value or the DC value. For example, it may be any of indices indicating the characteristic amount of the measurement sample, such as various average values (such as an additive average value and a weighted average value of an amplitude) relating to the scattered light component of the measurement sample, a median value or a maximum value in a distribution of the amplitude value, and a peak value of the amplitude, or a value based on some mathematical expression that creates a calculation result close to the values of these indices, or a combination thereof. In any case, the binarization coefficient is set appropriately in accordance with the selection of the noise-based setting value.

As the binarization coefficient, values taking account of characteristics such as the medium, concentration, a refractive index, and isothermal compressibility of the sample are determined correspondingly to the RMS value and the DC value at the time of design of the optical device, and preset in the storage area (not shown) prior to shipment from the factory.

The RMS value and the DC value, which are the sources of the noise-based setting values, are set respectively based on measurement results in a predetermined period of time (e.g. 5 seconds) after reception of the reset signal. For example, in a case of reset in response to a power ON operation, the RMS value and the DC value are determined based on values that have been measured for 5 seconds at a stage after completion of a warm-up operation of the light source 12. The RMS value is a value depending on the medium. For example, in comparison with the RMS value in the case where the medium is pure water, the RMS value in a case where the medium is sulfuric acid with a concentration of 96% is about 1.2 times, and the RMS value in a case where the medium is IPA is about 1.3 to 1.4 times. In addition, the DC value is about 60 to 70 mV in the case where the medium is pure water.

In the present embodiment, only the RMS value is used as the noise-based setting value. Therefore, the value which is preset is only the binarization coefficient corresponding to the RMS value. During the reset, the binarization threshold is automatically calculated by the product of the binarization coefficient and the RMS value.

Figure 5:
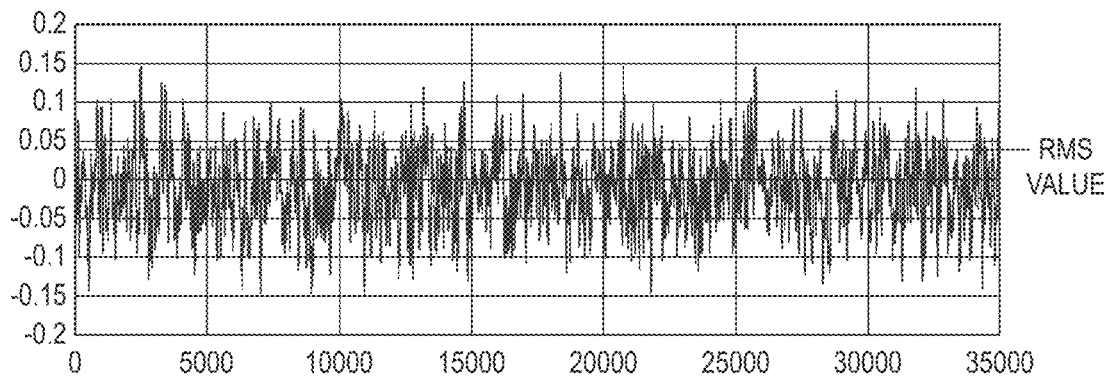
FIG. 5 A graph showing an example of a scattered light component after AC coupling for removing a DC component and leaving only an AC component and an RMS value.

FIG. 5 shows a specific example of the scattered light component after AC coupling in the case where the medium of the measurement sample is pure water and the RMS value set based on the scattered light component. In this example, the binarization coefficient is set at "3", and the calculation result of the RMS value of the scattered light component is "0.03 Vrms". Thus, the binarization threshold is calculated by the product of the binarization coefficient and the RMS value to be "0.09".

Incidentally, in the present embodiment, only the RMS value is used as the noise-based setting value. However, when only the DC value is used in place of the RMS value, only the binarization coefficient corresponding to the DC value is preset. Moreover, when values determined based on both the RMS value and the DC value are used, the binarization coefficients corresponding to the RMS value and the DC value respectively are preset. When configuration is made to allow use of a plurality of types of noise-based setting values, the particle measuring device 1 may be configured to automatically set an optimum setting value in accordance with selection of a measurement sample name from a preset measurement sample name list or selection of the characteristic amount of the scattered light component, or may be configured to manually set any of the setting values.

In selecting one from the types of the noise-based setting values, the RMS value is more suitable in a case where, for example, the particle measurement result may receive an effect derived from the DC value (such as a case where the light quantity of the laser light changes due to deterioration of the light source 12 or the like, thereby resulting in fluctuation of the intensity of the scattered light) when the DC value is selected. In addition, the RMS value is also more suitable in a case where a sample with high cleanness (with a small number of suspended particles) is used. On the other hand, in a case where a sample with a high particle concentration is used, the DC value is more suitable because it is difficult to distinguish a signal derived from a particle (target signal) from a signal derived from scattered light of the sample (scattered noise). In a case where a measurement result with higher accuracy can be obtained based on both the RMS value and the DC value, such a setting value may be used alternatively.

[Binarization Threshold Storage Unit]

The binarization threshold storage unit 39 stores the binarization threshold calculated by the binarization threshold calculation unit 38 in addition to the aforementioned binarization coefficient which has been determined in advance and preset before shipment from the factory. Upon reception of a reset signal from the reset unit 40 which will be described later, the binarization threshold storage unit 39 clears the binarization threshold stored at that time while holding the binarization coefficient as it is.

[Reset Unit]

In response to a reset operation on the particle measuring device 1, the reset unit 40 transmits the reset signal to the respective functional units involved in the signal processing using the stochastic resonance. Here, the "reset operation" means an operation causing reset among operations performed on the particle measuring device 1 by a user, and specifically means a power ON operation, an operation of pressing a setting button, for example, in accordance with a change in the measurement sample, or the like. When the user has performed the power ON operation, the reset signal is transmitted from the reset unit 40 after the warm-up operation of the light source 12 is completed. Or, when the user presses the setting button, the reset signal is transmitted from the reset unit 40 at that timing. Then, in conjunction with the transmission of the reset signal, the binarization threshold is automatically calculated in the binarization threshold calculation unit 38, and processing in the other functional units are also initialized.

[Pulse Height Analysis Unit]

While the aforementioned functional units 32 to 40 contribute to detection and counting of a particle having a particle size of less than 30 nm, the pulse height analysis unit 41 contributes to detection and counting of a particle having a particle size of not less than 30 nm. Specifically, the pulse height analysis unit 41, using, for example, a method similar to or the same as a particle counting method according to Japan Patent No. 4960772 ("existing method"), determines which particle size range in a plurality of the ranges the particle detected based on the input signal (output signal from the data input unit 31) is divided, where the particle size range being plural and setting to be 30 nm or more and several μm or less, and outputs a pulse corresponding to the determined particle size range. Incidentally, since the existing method has already been well known, detailed description of processing in the pulse height analysis unit 41 is omitted.

[Particle Counting Unit]

The particle counting unit 42 counts the number of detected particles for each particle size range based on the pulses outputted from the determination unit 37 and the pulse height analysis unit 41. Incidentally, the noise addition unit 33 to the determination unit 37, and the pulse height analysis unit 41 simultaneously proceed with different processes on one and the same input signal. And the pulses outputted from the determination unit 37 and the pulse height analysis unit 41 and inputted to the particle counting unit 42 are synchronized.

[Particle Counting Processing]

Figure 6:
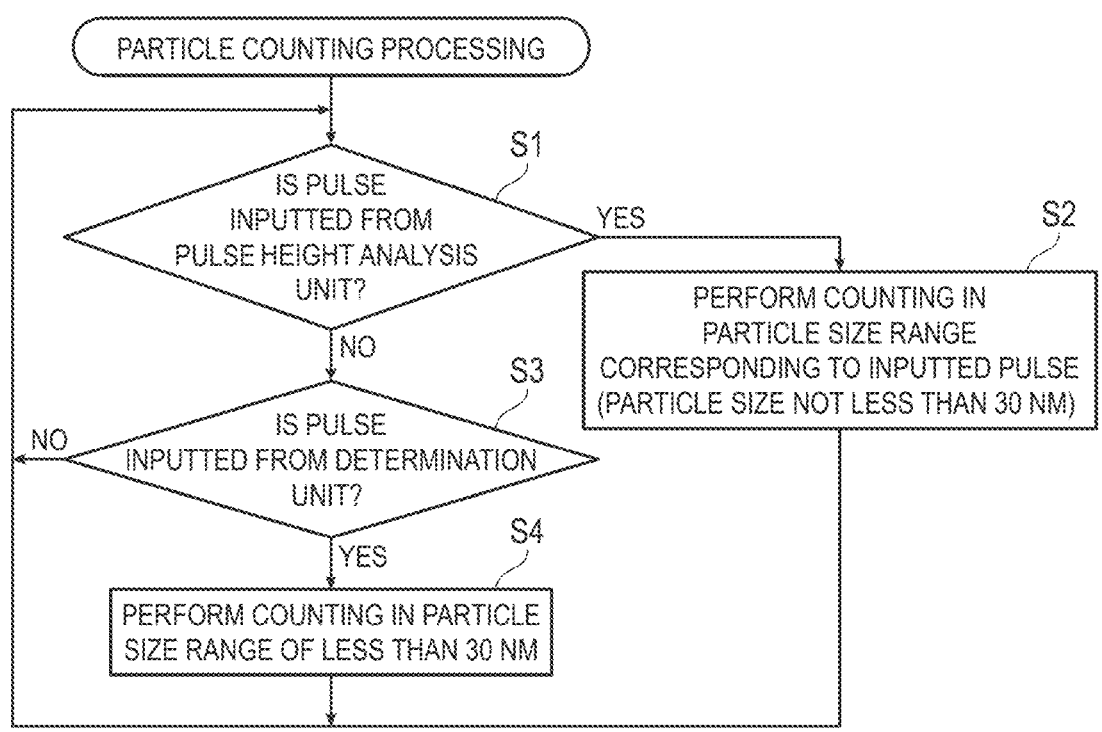
FIG. 6 A flowchart showing an example of a procedure of particle counting processing.

FIG. 6 is a flowchart showing an example of a procedure of particle counting processing executed by the particle counting unit 42. The particle counting unit 42 continues execution of the particle counting processing from the start of measurement until the end of the measurement. Description will be made below along the example of the procedure.

Step S1: The particle counting unit 42 checks whether a pulse has been inputted or not from the pulse height analysis unit 41. When the pulse has been inputted from the pulse height analysis unit 41 (step S1: Yes) as a result of the checking, the particle counting unit 42 executes a step S2. On the other hand, when no pulse has been inputted from the pulse height analysis unit 41 (step S1: No), the particle counting unit 42 executes a step S3.

Step S2: The particle counting unit 42 counts the number of detected particles in a particle size range corresponding to the pulse from the pulse height analysis unit 41. For example, when the pulse from the pulse height analysis unit 41 is a pulse corresponding to a particle size range of 40 nm to 50 nm, one is added to the number of detected particles in that particle size range.

Step S3: The particle counting unit 42 checks whether a pulse has been inputted or not from the determination unit 37. When the pulse has been inputted from the determination unit 37 (step S3: Yes) as a result of the checking, the particle counting unit 42 executes a step S4. On the other hand, when no pulse has been inputted from the determination unit 37 (step S3: No), the particle counting unit 42 returns to the step S1.

Step S4: The particle counting unit 42 counts the number of detected particles in a particle size range of less than 30 nm. Since the particle threshold that is a pulse output criterion in the determination unit 37 corresponds to 20 nm, as described above, one is added to the number of detected particles substantially in a particle size range of not less than 20 nm and less than 30 nm by this processing.

When the aforementioned procedure is completed, the particle counting unit 42 returns to the step S1 to repeatedly execute the sequence of the steps S1 to S4.

As described above, the pulse from the pulse height analysis unit 41 corresponds to any of the particle size ranges that are not less than 30 nm, whereas the pulse from the determination unit 37 is inputted when the particle exceeds the particle threshold corresponding to 20 nm. Therefore, when a signal derived from a particle having a particle size of not less than 30 nm is processed, pulses may be inputted simultaneously from both the pulse height analysis unit 41 and the determination unit 37 respectively. However, when the particle is counted along the aforementioned procedure, double counting for the single particle can be avoided so that the number of particles can be counted accurately.

Incidentally, the particle counting result performed by the particle counting unit 42 is inputted to the output unit 50. Then, the output unit 50 outputs the counting result to a monitor or a printer, or transmits the counting result to another device through a network.

The above is the configuration of the signal processing unit 30 in the present embodiment. Incidentally, the signal processing unit 30 may be mounted in a Digital Signal Processor (DSP), or may be mounted in a device capable of performing digital signal processing such as a Field Programmable Gate Array (FPGA). Alternatively, the signal processing unit 30 may be mounted as a program in a computer having general functions such as a Personal Computer. Incidentally, a computer-readable medium in which the program for executing the processing according to the present embodiment has been stored may be used.

[Signal Processing Using Stochastic Resonance (Embodiment)]

Figure 7:
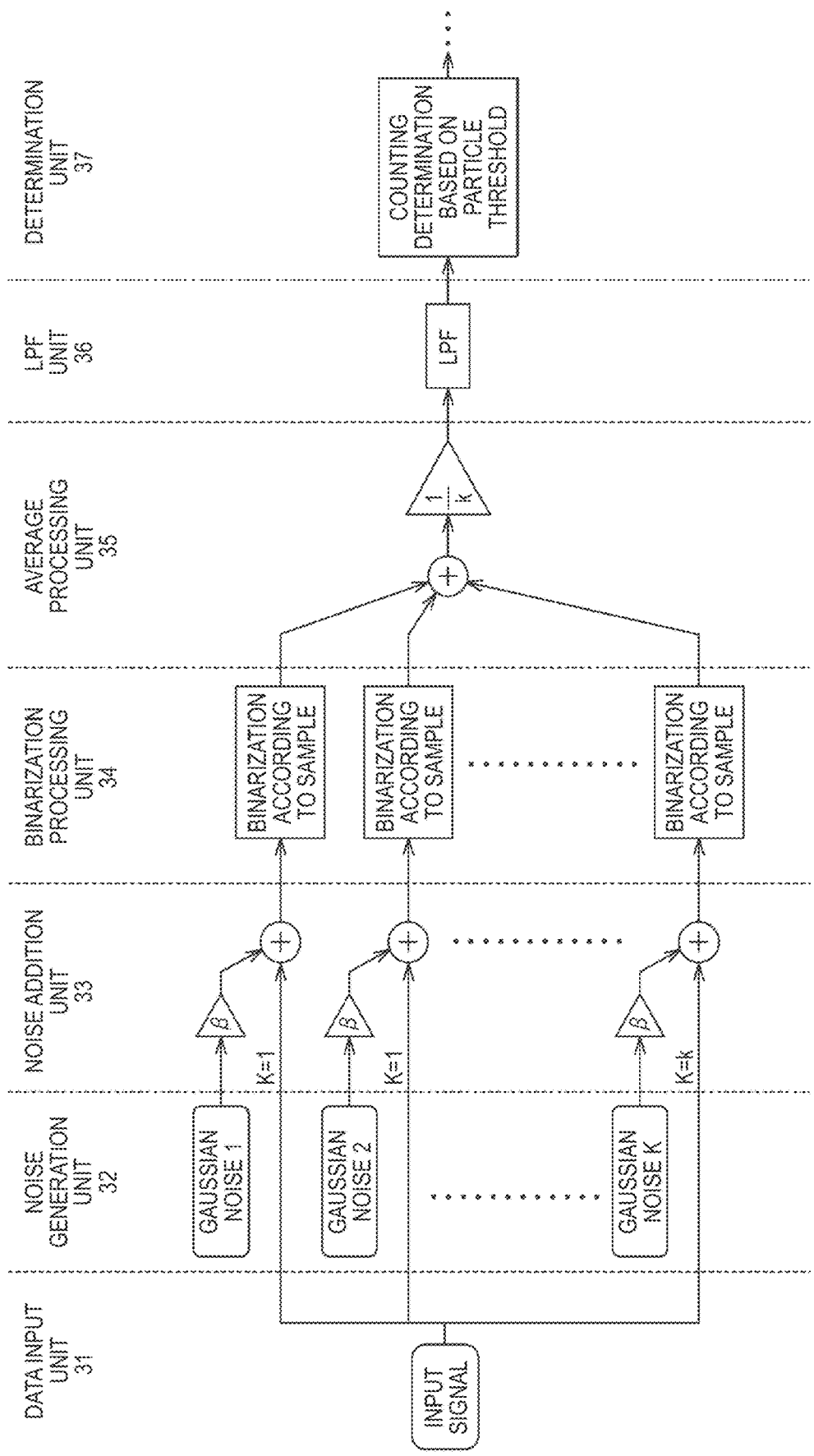
FIG. 7 A view briefly showing a mode of signal processing using stochastic resonance in an embodiment.

FIG. 7 is a view briefly showing a mode of signal processing using stochastic resonance in the present embodiment, i.e., processing for detecting a particle with a particle size of less than 30 nm. In addition, FIGS. 8A to 8C are views showing, for comparison, waveforms of a signal in respective stages of the signal processing using the stochastic resonance.

Figure 8A:
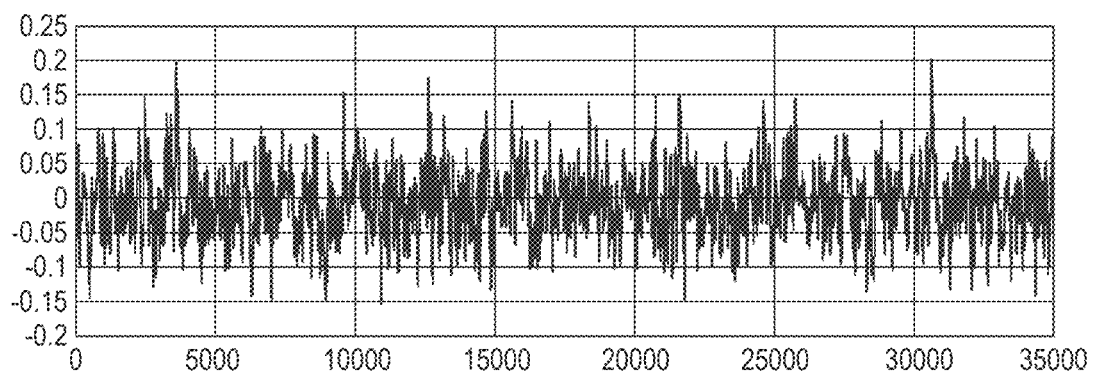
FIG. 8A A graph showing, for comparison, a waveform of a signal in each step of processing for detecting any particle with a particle size of less than 30 nm.

As shown in FIG. 7, in the signal processing according to the present embodiment, first, an input signal is sent from the data input unit 31 to the noise addition unit 33 in its original state (FIG. 8A). In addition, k sets of uncorrelated noises (Gaussian noises 1 to k) are generated in the noise generation unit 32, and sent to the noise addition unit 33. Then, k sets of parallel processing are executed in the noise addition unit 33, and each of the k sets of noises is added to the input signal with one and the same noise addition amount β. Each of the resulting signals after the addition is sent to the binarization processing unit 34, and is binarized using a binarization threshold automatically calculated in accordance with a medium of a measurement sample. Then, a simple average of the binarized values is calculated in the average processing unit 35, a result of the calculation is converted into a 10-bit signal, and the 10-bit signal is outputted (FIG. 8B). Of the output signal, a component which is out of a frequency band of the target signal is cut by the LPF unit 36 (FIG. 8C). Determination as to the signal that has passed through the LPF unit 36 is made in the determination unit 37. When the signal exceeds a particle threshold, a pulse indicating the fact is outputted.

Figure 8B:
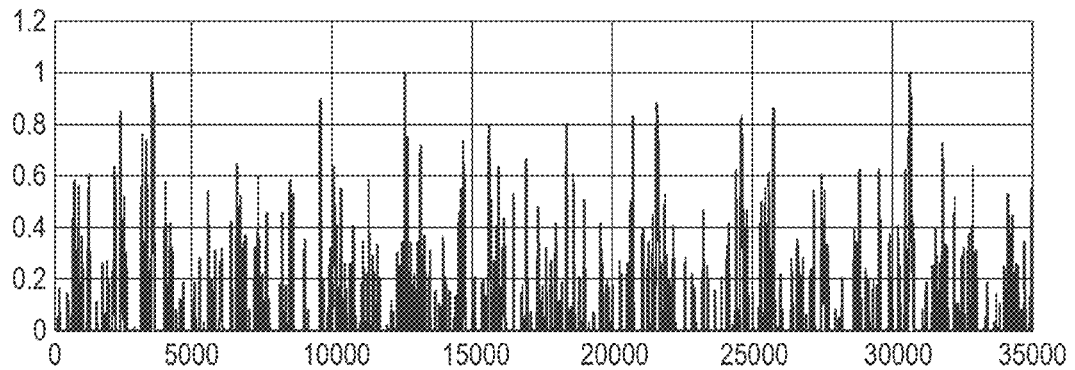
FIG. 8B A graph showing, for comparison, the waveform of the signal in each step of the processing for detecting any particle with a particle size of less than 30 nm.
Figure 8C:
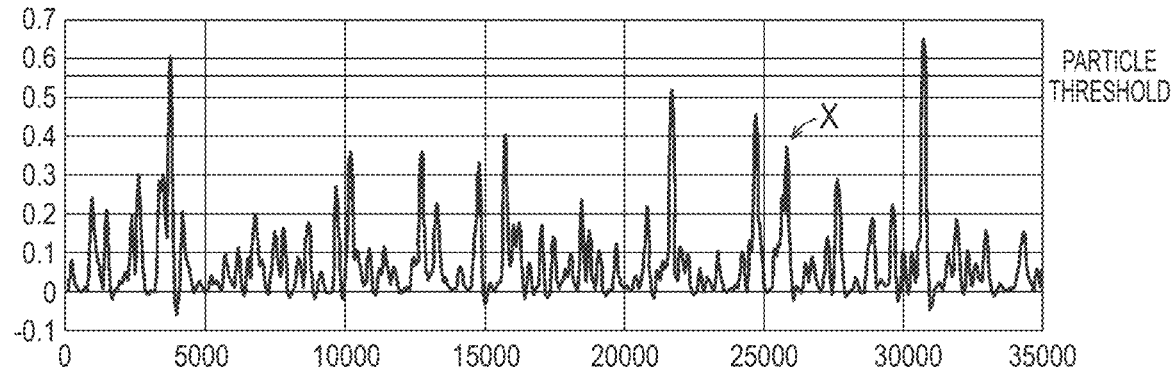
FIG. 8C A graph showing, for comparison, the waveform of the signal in each step of the processing for detecting any particle with a particle size of less than 30 nm.

When focusing on the waveforms in the respective stages of the signal processing, it can be known that the signal waveforms become simpler as the signal processing proceeds, as shown in FIGS. 8A to 8C. Specifically, since a signal derived from a particle (target signal) and a signal derived from background light (scattered noise) are mixed in the input signal, the signal waveform is very complicated (FIG. 8A). On the other hand, when the signal after the average processing is compared with the input signal, it can be known that peaks of the signal stand out more clearly (FIG. 8B). This is for the following reasons. When the target signal is included, the target signal remains as it is, even if the signals to which the noises have been added are averaged. On the other hand, when only noise is included, a level of the signal is lowered due to averaging of the uncorrelated noises so that the target signal relatively stands out.

Determination as to whether a particle with a particle size of not less than 20 nm is present or not is made based on the signal after the LPF processing (FIG. 8C). On this occasion, for example, when the particle threshold is set at a value 1.5 times as large as a peak value of a peak x of the scattered noise indicated by an arrow in FIG. 8C, two particles can be detected from the signal in an illustrated range. On the other hand, it is difficult to detect these particles even if processing by the existing method (processing performed by the pulse height analysis unit 41) is performed on the input signal in the same range. As a result, it is apparent that the particles smaller in particle size than those according to the existing method can be detected according to the present embodiment.

[Signal Processing Using Stochastic Resonance (Comparative Example)]

Figure 9:
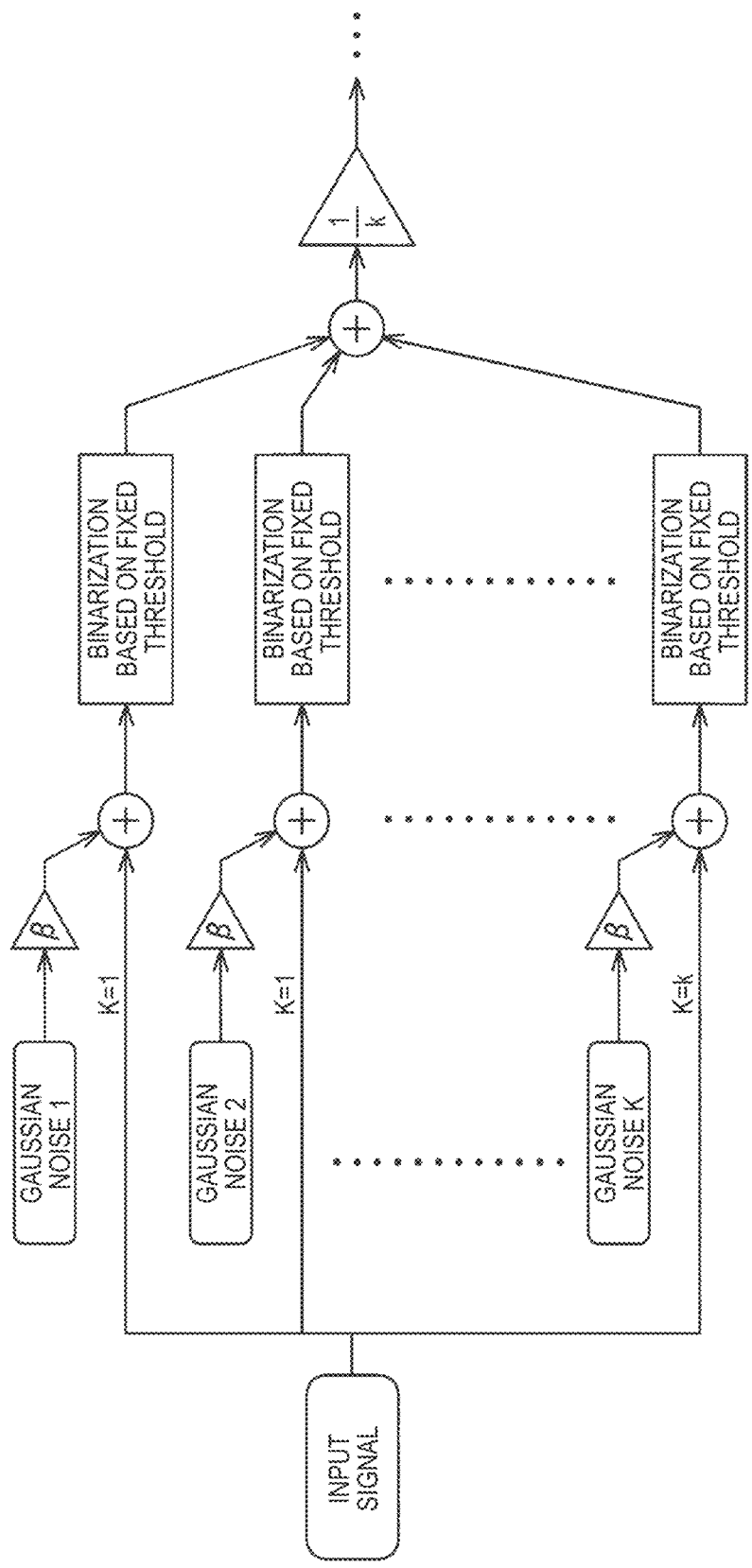
FIG. 9 A view briefly showing a mode of signal processing using stochastic resonance in a comparative example.

FIG. 9 is a view briefly showing an orthodox mode of signal processing using stochastic resonance as a comparative example.

In the comparative example, k sets of parallel processing are performed, and each of k sets of uncorrelated noises prepared in advance is added to the input signal with one and the same addition amount β. Each of the resulting signals after the addition is binarized using a fixed binarization threshold, and a simple average of the binarized values is calculated. A result of the calculation is sent to a latter-half of a further processing step.

Thus, in the comparative example, the k sets of noises need to be prepared in advance. Accordingly, as the parallel number k is larger, it takes more time and effort for the preparation, and a data volume required for storage of the noises is also larger. In addition, since the fixed binarization threshold is used in the binarization, it is impossible to cope with differences among measurement samples. When the measurement threshold can be manually reset whenever measurement is made, it takes time and effort for work for the manual reset, and the adjustment may be unsettled. This may significantly affect particle detection accuracy.

On the other hand, in the present embodiment, the k sets of noises are prepared by the noise generation unit 32 in a mode in which the plurality of noises are generated from certain noise data. Accordingly, the number of noise data prepared in advance can be reduced and the data volume required for storing the noise data can be suppressed. In addition, since the binarization threshold calculated by the binarization threshold calculation unit 38 in accordance with the medium of the measurement sample is used in the binarization, the time and effort required for the preparation of the measurement can be reduced and, simultaneously, the particle detection accuracy can be improved, in comparison with the case of the comparative example.

[Advantages of Present Invention]

According to the aforementioned embodiment, as described above, the following effects can be obtained.

(1) The output signal is binarized using the binarization threshold calculated based on the RMS value or the DC value of the scattered light component of the measurement sample. Therefore, it is possible to detect a lower-level signal derived from a particle while reducing misdetection. As a result, it is possible to measure the particle with a minimum measurable particle size of 20 nm.

(2) It is possible to measure a particle with a minimum measurable particle size smaller than that according to the existing method. Therefore, detection accuracy of the particle contained in the liquid and counting accuracy of the number of particles can be improved.

(3) The binarization threshold is automatically calculated in conjunction with the reset operation. Accordingly, it is possible to reduce time and effort required for preparation for the measurement in accordance with the sample.

(4) The uncorrelated noises which are added to the input signal in the parallel processing respectively are generated by the noise generation unit 32 in a mode in which the plurality of noises whose starting points are made different from one another are generated from certain noise data. Accordingly, it is possible to efficiently generate the plurality of uncorrelated noises while suppressing the number or the volume of the noise data required for the generation of the noises.

The present invention is not limited to the aforementioned embodiment but can be modified variously and carried out.

In the aforementioned embodiment, the parallel number k of the processing in the noise addition unit 33 is set at 100 but not limited thereto. According to the situation of the target signal or the noises in the measurement, the arithmetic processing capability of the signal processing unit 30, and the like, configuration may be made in such a manner that only one processing is executed (k=1) in place of the processing made parallel with one another.

In addition, when the parallel number k is set at a larger value, the signal data may be stored once in the storage area without being processed in real time, and then processed later every fixed period of time (e.g. every minute data). With such a configuration, the level of the noise after the average processing can be lowered more while the signal processing is performed stably under the limited arithmetic processing capability. As a result, the detection accuracy of the particle with the particle size of less than 30 nm can be improved more.

In the aforementioned embodiment, the minimum measurable particle size of the particle measuring device 1 is set at 20 nm, and the particle threshold used by the determination unit 37 for determination is determined accordingly. However, the minimum measurable particle size is not limited thereto. In addition, the determination unit 37 outputs a single pulse in accordance with a result of the determination. However, configuration may be made alternatively in such a manner that a plurality of particle thresholds are set and different pulses are outputted in accordance with the particle thresholds any of which an output signal exceeds. With such a configuration, the number of detected particles that are less than 30 nm in particle size can be also counted for each of the particle size ranges.

In the aforementioned embodiment, the L-shaped flow cell 11 is used. However, any shape can be used as the shape of the flow cell as long as the shape has a portion bent into an L-shape. For example, a U-shape or a crank shape may be used in place of the L-shape.

In addition thereto, the materials, numerical values, and the like listed as examples of the constituent components of the particle measuring device 1 are merely exemplified. It is a matter of course that modification can be made suitably when the present invention is carried out.

The invention claimed is:

1. A particle measuring device comprising;
   an optical detector configured to detect scattered light generated due to interaction between a particle contained in a liquid sample and light incident on the liquid sample, and convert the detected scattered light into a signal with a magnitude corresponding to intensity of the detected scattered light; and
   a processor coupled to a memory storing instructions to permit the processor to function as:
      an addition unit configured to perform a predetermined number of parallel processing on the signal to add a predetermined number of uncorrelated noises to the signal respectively and output resulting signals after the addition;
      a binarization unit configured to binarize the resulting signals after the addition using a binarization threshold set in accordance with the liquid sample, and output the binarized signals;
      a calculation unit configured to calculate and output a value based on the binarized signals;
      a filter unit configured to pass a predetermined frequency component of the output of the calculation unit;
      a determination unit configured to determine that the particle is present when an output of the filter unit exceeds a predetermined particle threshold determined in advance according to a minimum measurable particle size of the particle measuring device; and
      a binarization threshold calculation unit configured to calculate the binarization threshold based on a characteristic amount of a scattered light component of the liquid sample.

2. The particle measuring device according to claim 1, wherein the binarization unit binarizes the resulting signals after the addition using the binarization threshold calculated by the binarization threshold calculation unit.

3. The particle measuring device according to claim 2, wherein the binarization threshold calculation unit calculates the binarization threshold based on an RSM value or a DC value of the scattered light component of the liquid sample.

4. The particle measuring device according to claim 1, further comprising:
   a storage unit configured to store noise data having a predetermined data length,
   wherein the processor further functions as a noise generation unit configured to generate the predetermined number of the noises as uncorrelated noises that are generated from the noise data using different starting points respectively, and
   wherein the addition unit adds the predetermined number of the uncorrelated noises generated by the noise generation unit.

5. The particle measuring device according to claim 1, wherein the calculation unit calculates and outputs an average value of the binarized signals.

6. A particle measuring method comprising:
   detecting scattered light generated due to interaction between a particle contained in a liquid sample and light incident on the liquid sample, and converting the detected scattered light into a signal with a magnitude corresponding to intensity of the detected scattered light;
   performing a predetermined number of parallel processing on the signal to add a predetermined number of uncorrelated noises to the signal respectively and output resulting signals after the performing the predetermined number;
   binarizing the resulting signals after the addition using a binarization threshold set in accordance with the liquid sample, and outputting the binarized signals;
   calculating and outputting a value based on the binarized signals;
   passing a predetermined frequency component of the output in the calculating and outputting the value;
   determining that the particle is present when the output in the passing the predetermined frequency component exceeds a predetermined particle threshold determined in advance according to a minimum measurable particle size of a particle measuring device; and
   calculating the binarization threshold based on a characteristic amount of a scattered light component of the liquid sample,
   wherein, in the binarization, the resulting signals after the addition are binarized using the binarization threshold calculated by the binarization threshold calculation.

7. A non-transitory computer readable medium encoded with a signal processing program for measuring a particle included in a liquid sample, that is to be executed by a computer including a processor coupled to a memory storing instructions to permit the processor to function as:
   an addition unit that performs a predetermined number of parallel processing on a signal to add a predetermined number of uncorrelated noises to the signal respectively and outputs resulting signals after the addition, the signal having a magnitude corresponding to intensity of scattered light generated due to interaction between the particle and light incident on the liquid sample;
   a binarization unit that binarizes the resulting signals after the addition using a binarization threshold set in accordance with the liquid sample, and outputs the binarized signals;
   a calculation unit that calculates and outputs a value based on the binarized signals;
   a filter unit that passes a predetermined frequency component of the output of the calculation unit;
   a determination unit that determines that the particle is present when an output of the filter unit exceeds a predetermined particle threshold determined in advance according to a minimum measurable particle size of a particle measuring device; and
a binarization threshold calculation unit that calculates the binarization threshold based on a characteristic amount of a scattered light component of the liquid sample,
wherein the binarization unit binarizes the resulting signals after the addition using the binarization threshold calculated by the binarization threshold calculation unit.

* * * * *